(12) United States Patent
Gao

(10) Patent No.: US 7,103,033 B2
(45) Date of Patent: Sep. 5, 2006

(54) ROBUST VOCODER RATE CONTROL IN A PACKET NETWORK

(75) Inventor: Qiang Gao, La Jolla, CA (US)

(73) Assignee: Telefonaktiebolaget LM Ericsson (publ), (SE)

( * ) Notice: Subject to any disclaimer, the term of this patent is extended or adjusted under 35 U.S.C. 154(b) by 1064 days.

(21) Appl. No.: 10/033,091

(22) Filed: Oct. 23, 2001

(65) Prior Publication Data
US 2003/0076793 A1 Apr. 24, 2003

(51) Int. Cl.
*H04L 12/66* (2006.01)
(52) U.S. Cl. .................. 370/352; 370/338; 370/465
(58) Field of Classification Search ............. 370/351, 370/352, 347, 442, 465, 401, 329, 338, 349, 370/353–356; 704/219, 201, 200, 270; 455/502
See application file for complete search history.

(56) References Cited

U.S. PATENT DOCUMENTS

| | | | |
|---|---|---|---|
| 5,898,696 A | 4/1999 | Proctor et al. | |
| 6,091,969 A | 7/2000 | Brophy et al. | |
| 6,157,636 A | 12/2000 | Voit et al. | |
| 6,157,648 A | 12/2000 | Voit et al. | |
| 6,252,862 B1 | 6/2001 | Sauer et al. | |
| 2005/0013281 A1* | 1/2005 | Milton et al. | 370/349 |
| 2005/0026642 A1* | 2/2005 | Lee et al. | 455/522 |

OTHER PUBLICATIONS

Sprint PCS Transcoder Meeting Notes—May 1, 2001 (2 pages).
RTP Payload Format for EVRC (13 pages).

* cited by examiner

*Primary Examiner*—Ajit Patel
(74) *Attorney, Agent, or Firm*—Coats & Bennett, P.L.L.C.

(57) ABSTRACT

A vocoder control technique provides robust vocoder control allowing a radio access network (RAN) to reliably control remote vocoding functions in support of mobile station signaling. In some wireless communication network implementations, vocoding functions are remote from the RAN, such as where a base station controller interconnects with a media gateway via a packet core network, with the media gateway providing vocoding services for voice data incoming from the PSTN. When the RAN has IS-95/IS-2000 signaling messages for the mobile station, it inserts a specialized rate control message into one or more voice frames passing from the RAN to the media gateway. The message defines the desired rate constraint and the number voice frames to be constrained. In response, the media gateway applies the desired rate constraint to the specified number of frames, allowing the RAN to insert signaling messages into the rate constrained frames using dim-and-burst signaling techniques.

63 Claims, 8 Drawing Sheets

| 0 | 1 | 2 | 3 | 4 |
|---|---|---|---|---|
| V | CR | | CL | |

FIG. 5A

| CR VALUE | MEANING |
|---|---|
| 00 | FULL RATE |
| 01 | 1/2 RATE |
| 10 | 1/4 RATE |
| 11 | 1/8 RATE |

FIG. 5B

| CL VALUE | MEANING |
|---|---|
| 00 | 1 VOICE FRAME WILL BE RATE-CONSTRAINED |
| 01 | 2 VOICE FRAMES WILL BE RATE-CONSTRAINED |
| 10 | 3 VOICE FRAMES WILL BE RATE-CONSTRAINED |
| 11 | 4 VOICE FRAMES WILL BE RATE-CONSTRAINED |

FIG. 5C

ROBUST VOCODER RATE CONTROL IN A PACKET NETWORK

BACKGROUND OF THE INVENTION

The range of services offered by wireless communication networks continues its evolution from essentially voice-only service to a rich combination of data services in addition to voice service. One consequence of this evolution is that large portions of the wireless communication network are increasingly designed with an emphasis on supporting the newer, higher bandwidth data services. Wireless Internet access in support of web browsing and streaming media services are examples of these higher bandwidth data services.

In keeping with the nature of these newer data services, the wireless communication network is increasingly packet oriented. For example, a wireless communication network may be, at its core, an assemblage of various network entities interconnected through a packet-based network. While this arrangement suits the packet data flowing between the communication network and the Internet or other packet data networks, it sometimes poses special challenges for legacy services, such as voice.

For example, to reduce the amount of data carried internally by the communication network, voice encoding and decoding (vocoding) functions may be transferred from the radio access network (RAN) to a gateway device, such as a media gateway, that connects the RAN to the Public Switched Telephone Network (PSTN). Voice data received from the PSTN at the gateway device for mobile stations supported by the RAN is compressed and formatted into voice frames, which are then transferred to the RAN in packetized form via some type of packet network interconnecting the RAN and the gateway device.

Locating vocoding functions remote from the RAN imposes special challenges when the RAN needs to assert vocoding control in support of signaling operations. For example, one approach to transferring signaling information to a mobile station is referred to as dim-and-burst, and involves applying greater compression to the voice data so that a voice frame has "room" for one or more signaling bits. Thus, a number of rate-constrained voice frames may be used to transmit a signaling message from the RAN to the mobile station, but only if the RAN has some mechanism for generating or at least requesting the generation of such rate-constrained frames.

Controlling the vocoder in support of dim-and-burst signaling is straightforward when the RAN performs vocoding, but is more complicated when a remote network entity performs the vocoding. When vocoding is remote from the RAN, the network, must have a reliable mechanism for remote vocoder control.

SUMMARY OF THE INVENTION

The present invention comprises systems and methods for controlling vocoding functions that are implemented remote from the radio access network (RAN). For example, a media gateway may interface the RAN with the PSTN and provide vocoding functions for voice data incoming from the PSTN. When the RAN needs to send signaling messages to a mobile station it is supporting, it sends a control message to the media gateway specifying both a constraint rate and a frame count that the media gateway uses to temporarily constrain the rate of one or more voice frames. This allows the RAN to insert signaling information into these rate constrained frames using dim-and-burst signaling techniques.

When the RAN needs to send a signaling message to a mobile station engaged in a voice call, it generates a control message with the appropriate rate constraint and frame count values. Upon sending this control message to the media gateway, the RAN starts a timer. If the media gateway successfully receives the control message, it will begin applying the requested rate constraint, or possibly a greater constraint, to a defined number of subsequent voice frames encoded for the mobile station by the media gateway.

The RAN inserts the signaling information for the mobile station into these rate-constrained frames using dim-and-burst signaling techniques. If all of the signaling information is sent before expiration of the timer, the timer is stopped and readied for subsequent use. However, if the RAN does not receive a number of rate-constrained voice frames from the media gateway sufficient to transmit all of the required signaling information from the RAN to the mobile station before expiration of the timer, it switches to blank-and-burst signaling. With blank-and-burst signaling, voice data that would otherwise be carried in voice frames transmitted from the RAN to the mobile station is replaced with signaling information.

At the media gateway, any number of control messages may be accumulated and prioritized. A first-in-first-out (FIFO) buffer might be used to accumulated message, for example. With this arrangement, the media gateway reads control messages from its buffer and applies them to the required number of subsequent voice frames sent from the media gateway to the RAN for the involved mobile station or stations. The media gateway may constrain voice frame encoding at the rate specified in the control message, or may form one or more voice frames with a greater constraint applied.

BRIEF DESCRIPTION OF THE DRAWINGS

FIGS. 5A–C are diagrams of exemplary control message formats used in remote vocoder control.

DETAILED DESCRIPTION OF THE INVENTION

Figure 1:
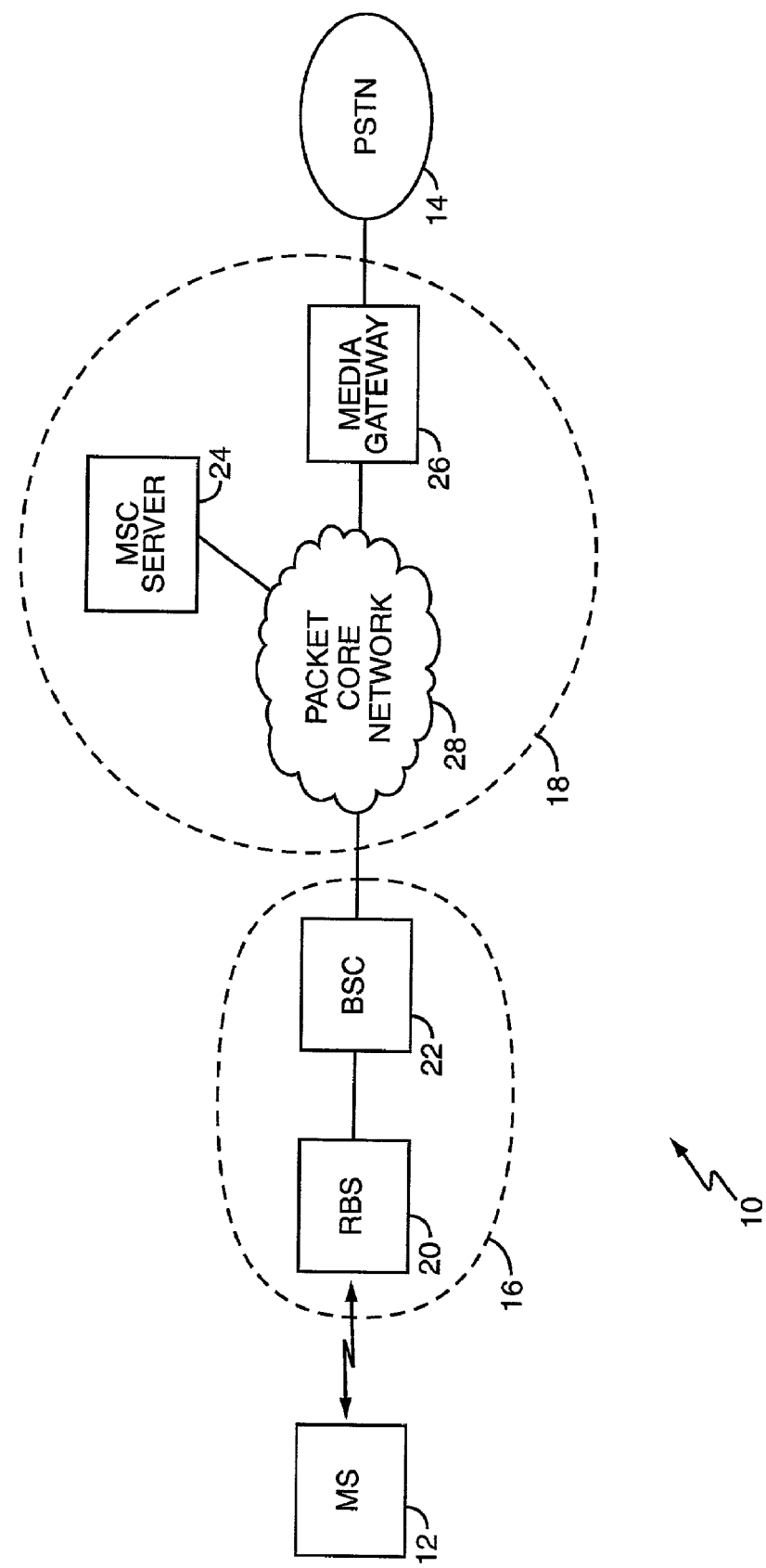
FIG. 1 is a diagram of an exemplary wireless communication network.

FIG. 1 is an exemplary wireless communication network generally referred to by the numeral 10. The network 10 provides communication between a mobile station 12 and the Public Switched Telephone Network (PSTN) 14 (or other external communication network). The network 10 comprises a radio access network (RAN) 16 and a core network (CN) 18. The RAN 16 interfaces a plurality of mobile stations 12 with the CN 18 and comprises a radio base station (RBS) 20 and a base station controller (BSC) 22. Various entities within the CN 18 provide call setup and processing support for the RAN 16, including a mobile switching center (MSC) server 24, and a media gateway 26, which are all interconnected together and to the RAN 16 by a packet core network (PCN) 28. It should be understood that the network 10 might in practice include various other entities not illustrated, and might include pluralities of one or more entities, illustrated or not.

Figure 2:
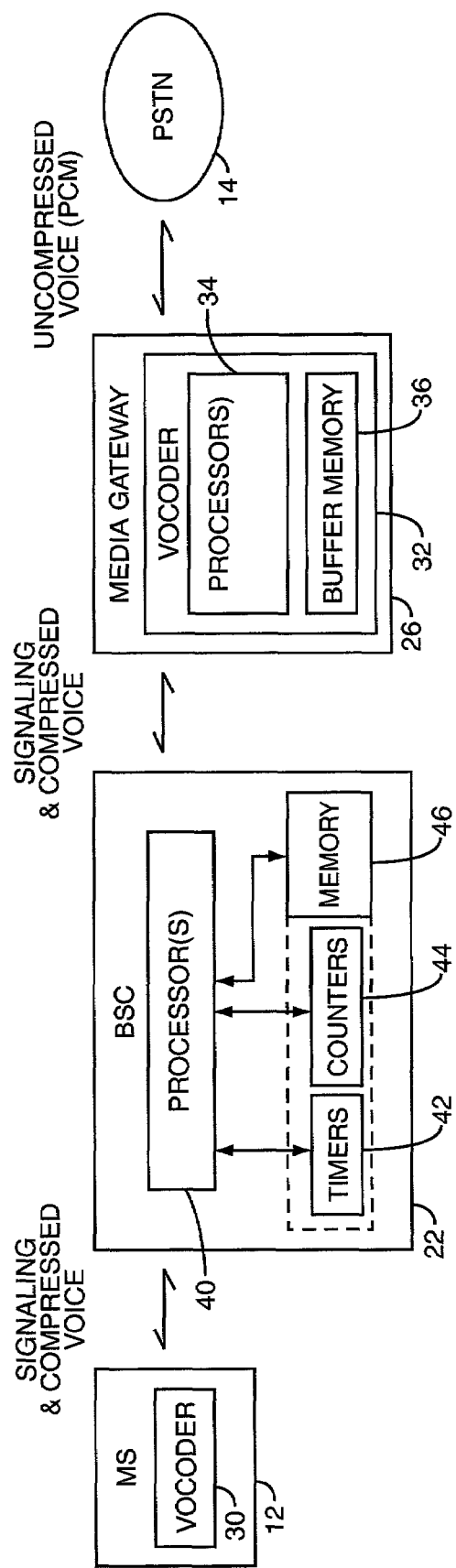
FIG. 2 is a diagram of exemplary vocoding details relevant to the network of FIG. 1.

FIG. 2 illustrates some of the above entities in more detail and provides a convenient basis for discussing operation of the network 10 in the context of voice calls involving the mobile station 12. The mobile station 12 receives audio input from a user or other audio source, which is converted into digital format and encoded for transmission to the RAN 16. If the network 10 operates in accordance with TIA/EIA/IS-95 or IS-2000 standards, input voice is digitally encoded into twenty millisecond voice frames. The mobile station 12 transmits these voice frames to the RAN 16, which passes them along to the media gateway 26 through the PCN 28 for decoding and transfer to the PSTN 14.

The mobile station 12 includes a vocoder (voice encoder/decoder) 30 that performs the required encoding for voice frames sent to the RAN 16 and decoding for voice frames received from the RAN 16. Voice frames transmitted from the RAN 16 to the mobile station 12 may originate from a number of sources, including the media gateway 26. For example, the mobile station 12 might be engaged in a call with a user of the PSTN 14, in which case the media gateway 26 receives incoming voice data from the PSTN 14, which it then encodes into voice frames, which are transferred to the RAN 16 through the PCN 28, and then transmitted to the mobile station 12.

In support of this role, the media gateway 26 includes a vocoder 32, which might comprise one or more processors 34, and buffer memory 36. It should be appreciated that one or more digital signal processors (DSPs) may be adapted to provide vocoding functions in support of call processing for a plurality of mobile stations 12 engaged in calls with the PSTN 14.

Voice frames sent from the media gateway 26 to the RAN 16 are received by the BSC 22, which passes them along to the appropriate RBS 20 for radio transmission to the mobile station 12. The BSC 22 must also send signaling information (control information) from time to time to the mobile station 12. The nature of this signaling information and the frequency with which it must be sent will depend upon the air interface standard employed by the network 10, as those skilled in the art will readily appreciate. As was earlier mentioned, the IS-95 and IS-2000 Code Division Multiple Access (CDMA) air interface standards are exemplary references.

Two approaches to sending signaling messages from the RAN 16 to the mobile station 12 are of interest in the context of the present invention. Better appreciating the differences between these approaches requires more detail regarding voice frame encoding. For a given voice call, one of a number of defined rate sets might be adopted.

The term "rate set" refers to the maximum voice rate associated with encoding voice data for that call. Examples of typical encoding rates in the IS-95/2000 context are roughly 14.4 kbps, 9.6 kbps, and 4.8 kbps. The encoding rate refers to the effective number of digital bits per second that are used to represent the voice data.

A higher bit rate corresponds to less encoding and to higher voice quality. Thus, for a given call, 14.4 kbps might be set as the full-rate encoding value. The full-rate may vary for different users, and the encoding rate might shift back and forth between full-rate (14.4), half-rate, quarter-rate, and so on, as needed during the call. The need for constraining the encoding rate to something less than full rate, which represent the best voice quality for the given rate set, might arise because of the need to send signaling messages to the mobile station 12, for example.

This point returns the discussion to the signaling formats of interest with regard to the present invention. With dim-and-burst signaling, the encoding rate is constrained to something less than full-rate encoding. This action means that fewer bits of information are used to carry voice information within the rate-constrained voice frames than would be used in full-rate voice frames. Reducing the number of bits given over to voice information leaves "extra" bits available in each voice frame, which bits are used to convey signaling information to the mobile station 12.

Therefore, if the RAN 16 has a signaling message that it needs to send to the mobile station 12, it might simply send a portion of that message in each of a number of rate-constrained voice frames transmitted to the mobile station 12. While constraining the encoding rate does degrade voice quality somewhat, dim-and-burst signaling usually results in less degradation than arises with the second signaling technique, which is referred to as "blank-and-burst" signaling.

With blank-and-burst signaling, the signaling information replaces all of the voice information that would otherwise be carried within one or more voice frames. Consequently, an entire voice frame is "lost" from the perspective of the receiving vocoder where that frame is blanked by signaling information. While inferior to dim-and-burst signaling from a voice quality perspective, it is sometimes necessary to use blank-and-burst signaling. For example, blank-and-burst signaling might be necessary where transmission of the desired signaling message from the RAN 16 to the mobile station 12 cannot be delayed.

When vocoding functions for the voice frames sent from the RAN 16 to the mobile station 12 reside within the BSC 22, then controlling encoding rates in support of dim-and-burst signaling is straightforward. However, it makes more sense minimize data overhead by transporting compressed voice (encoded voice) through the PCN 28. Accomplishing this data reduction however requires that voice data incoming from the PSTN 14 or other outside network be encoded at the media gateway 26, rather than at the BSC 22. This architectural arrangement requires that the BSC 22 have some mechanism by which it controls vocoding operations in the media gateway 26.

This remote vocoder control is further complicated by the fact that packet networks may occasionally drop data packets. Thus, vocoder control information sent by the BSC 22 is subject to loss within the PCN 28. Such packet data loss might be particularly problematic if the BSC sends a first data packet to initiate rate-constrained encoding at the media gateway 26, and then sends a second packet to end the constrained condition. Loss of the second packet would result in an undesirable continuation of the rate-constraint condition in the media gateway 26, even if it eventually returns to full-rate encoding by virtue of some time-out mechanism.

Using packet acknowledgement schemes, such as where the commands to enter and exit constrained mode would require some type of ACK or NACK signaling to insure delivery of vocoder control packets might provide the sort of control certainty that is desirable. However, this approach adds too much signaling overhead thereby defeating the original purpose of locating vocoder functions in the media gateway 26. The present invention provides robust vocoder control without need for ACK or NACK signaling, and includes fallback procedures for insuring that signaling messages are sent via blank-and-burst techniques if attempts to send the information via dim-and-burst signaling fail.

Figure 3A:
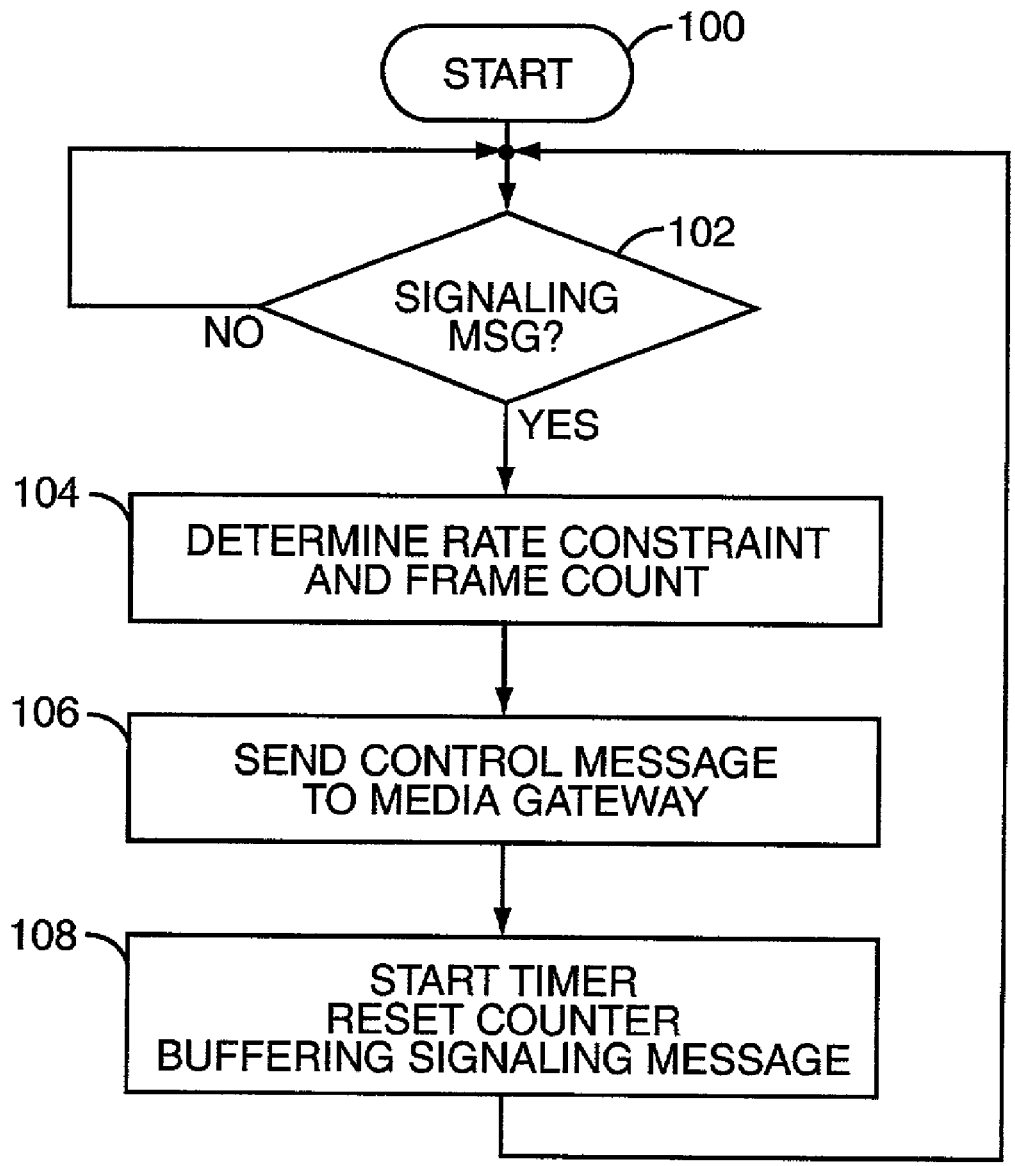
FIGS. 3A and 3B are diagrams of exemplary flow logic for remote vocoder control from the perspective of the radio access network in FIG. 1.
Figure 3B:
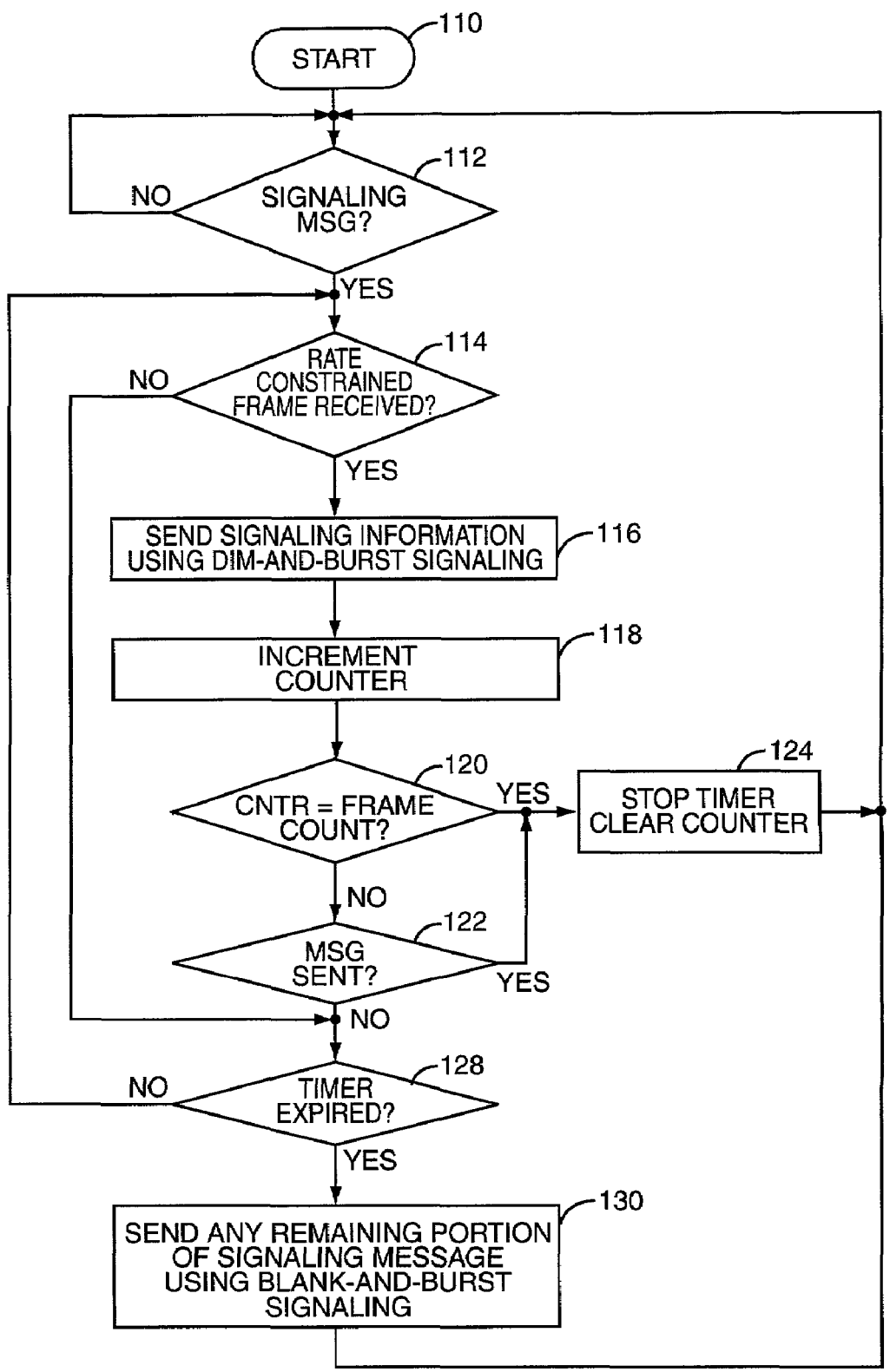

FIGS. 3A and 3B illustrate flow logic for an exemplary approach to robust control of the vocoder functions in the media gateway 26. The logic flows generally represents the program functions for remote vocoder control in support of call processing associated with mobile station 12. It should be understood that this or similar logic may be used to support vocoder control for a plurality of mobile stations 12. That is, the BSC 22 might independently control encoding rates for many mobile stations 12 to provide those mobile stations with required signaling information.

The BSC 22 may include processors(s) 40, supporting timers 42 and counters 44, and associated memory 46 that support the following functionality. It should be understood that as used herein, the terms "timer" and "counter" encompass hardware and software implementations, and thus should not be construed as necessarily representing some fixed logic circuit or circuits. Indeed, timers 42 and counters 44 may be implemented as software functions by the processor 40, may be actual circuits, such as memory and/or logic circuits, or may be some combination thereof. Further, it should be understood that memory 46 may provide working space for timer and counter functions.

In an exemplary embodiment, processors 40 logically comprise at least processors 40A and 40B, which cooperate in remote vocoder control and mobile station signaling operations. For example, processor 40B might generate air interface signaling messages, or receive them from another entity within the BSC 22, while processor 40A might provide the corresponding control messages to the media gateway 26. Of course, this implementation represents just one of many possible processing embodiments. It should be understood that processors 40A and 40B, or like sets of processors 40A-1 . . . N, and 40B-1 . . . N, may represent logical instantiations of desired processing functions within one or more processing devices or systems generally designated as processors 40.

In an exemplary arrangement, processor 40A supports the flow logic of FIG. 3A, where processing begins (step 100) with the BSC 22 determining whether it has any signaling information for mobile station 12 (step 102). If not, processing continues monitoring for the need to send such information (i.e., step 102 repeats). If there is a signaling message to be sent, the BSC 22 determines a rate constraint value and a corresponding number of frames sufficient to convey the message to the mobile station 12 using dim-and-burst signaling (step 104).

The BSC 22 then sends or transfers a control message comprising the rate constraint and frame count values to the media gateway 26 (step 106). FIGS. 5A–5C illustrate exemplary control message structures. Control messages are preferably passed from the RAN 16 to the media gateway 26 in voice frames sent from the BSC 22 to the media gateway 26. Thus, the control message may be structured as a set of binary values. FIG. 5A illustrates one approach, where "V" is a one-bit value that alerts the media gateway 26 to the presence of "CR" and "CL" values within a voice frame. Here, CR and CL represent constraint rate and constraint length values, which tell the media gateway 26 what rate constraint to use and the number of frames to which that constraint applies.

FIGS. 5B and 5C illustrates exemplary binary encoding for the rate constraint and constraint length values. Here, both CR and CL are defined as two-bit binary values, and thus may be used to represent any one of four rate constraint values and any one of four frame count values. It should be understood that a greater or lesser number of bits might be used, depending upon the number of unique CR and CL values desired.

By including the constraint rate and constraint length (frame count) values within the same control message, the media gateway receives both the rate-constraint and a corresponding frame count value specifying the number of voice frames to which it should apply the rate constraint. Configuring the control message thusly guarantees that if the media gateway 26 receives it, the media gateway 26 knows both what rate constraint to apply and for how long to apply it. The media gateway 26 will not operate in the rate-constrained condition any longer than necessary to accomplish dim-and-burst signaling at the BSC 22.

However, because the media gateway 26 might not receive the control message at all, or might not comply with it for one or more reasons, the BSC 22 starts a timer 42 in conjunction with sending the control message, buffers the signaling message, and may clear an associated counter (step 108). The timer 42 is configured with an expiration period matched to the time requirements of the signaling message, or may be configured to a default timing value based on other signaling timing requirements. Further, the setting of the timer 42, or the subsequent monitoring for rate-constrained voice frames from the media gateway, may be adjusted to accommodate any network latency or transport delay. That is, there may be a known minimum delay between requesting rate-constrained frames and their subsequent receipt. In any case, once timer 42 is started, initial processing associated with the current signaling message at processor 40A returns (step 102).

FIG. 3B illustrates exemplary flow logic for processor 40B in conjunction with the activities of processor 40A above. In this exemplary embodiment, processor 40B controls transmission of a signaling message based on whether a sufficient number of rate-constrained voice frames are received in timely fashion from the media gateway 26. Processing begins (step 110) with the BSC 22 determining whether there is a signaling message to be sent (step 112). If not, the BSC 22 continues monitoring for signaling messages. Here, monitoring might entail processor 40B receiving a signaling message directly or indirectly from processor 40A, or checking whether a signaling message is otherwise buffered and available for processing. Signaling messages may be processed directly or processed from a buffer in memory 46 in the BSC 22 based on a time priority, a message priority, or a combination of priorities.

If one or more signaling messages are buffered or otherwise available (step 112), the BSC 22 monitors for receipt of rate-constrained voice frames from the media gateway 26 (step 114). If a rate-constrained frame is received before expiration of the timer 42, the BSC 22 sends at least some of the signaling message to the mobile station 12 in that rate-constrained frame using dim-and-burst signaling (116). For each rate-constrained frame received before expiration of the timer 42, the BSC 22 increments one of the counters 44 (step 118), thereby tracking how many rate-constrained frames are received. If the number of rate-constrained frames received matches the frame count value calculated by the BSC 22 (step 120), the signaling message will have been successfully sent. In this case, the BSC 22 stops the timer 42 (step 124), which prevents its expiration, optionally clears the counter 44, and processing returns to monitoring for additional signaling messages (step 112).

If no rate-constrained voice frames are received (step 114), the BSC 22 checks for expiration of the timer 42 (step 128). If the timer 42 has expired, the BSC 22 uses blank-and-burst signaling to transmit the signaling message to the mobile station 12 (step 130). This action prevents delaying transmission of signaling messages from the RAN 16 to the mobile station 12. That is, the timer 42 serves as a fail-safe mechanism in that it allows a suitable period of time in which dim-and-burst signaling may be used, but overrides that signaling scheme with blank-and-burst signaling at the end of that period.

Because the media gateway 26 might apply a greater rate constraint than that specified in the control message (i.e., apply ¼ rate encoding when ½ rate encoding was requested), the signaling message might be sent in a lesser number of frames than the frame count value. Thus, the BSC 22 tracks transmission of the signaling information comprising the signaling message, and checks to see whether the full signaling message has been sent, even if the frame count check is not satisfied (step 122). If message transmission is completed, the timer 42 is stopped to prevent its expiration (step 124) and processing returns to monitoring for signaling messages (step 112). If the message transmission is not completed, and timer 42 has not expired (step 128), processing returns to checking for receipt of rate-constrained frames (step 114).

If a sufficient number of rate-constrained voice frames to support sending the entire signaling message before expiration of the timer 42, the BSC 22 uses blank-and-burst signaling (step 130) to send any remaining portion of the signaling message. Thus, the BSC 22 adopts an approach to signaling where dim-and-burst techniques are preferably used in transmitting signaling messages to mobile stations 12, but where timing safeguards insure timely delivery of those signaling messages using blank-and-burst signaling if necessary.

Each signaling message sent from the RAN 16 to the mobile station 12 generally has its own timing requirements. Because of this, the BSC 22 may maintain separate sets of timers 42 and counters 44 for each signaling message. Indeed, the BSC 22 may maintain separate logical processes supporting remote vocoder control for signaling operations associated with a plurality of mobile stations 12.

Figure 6:
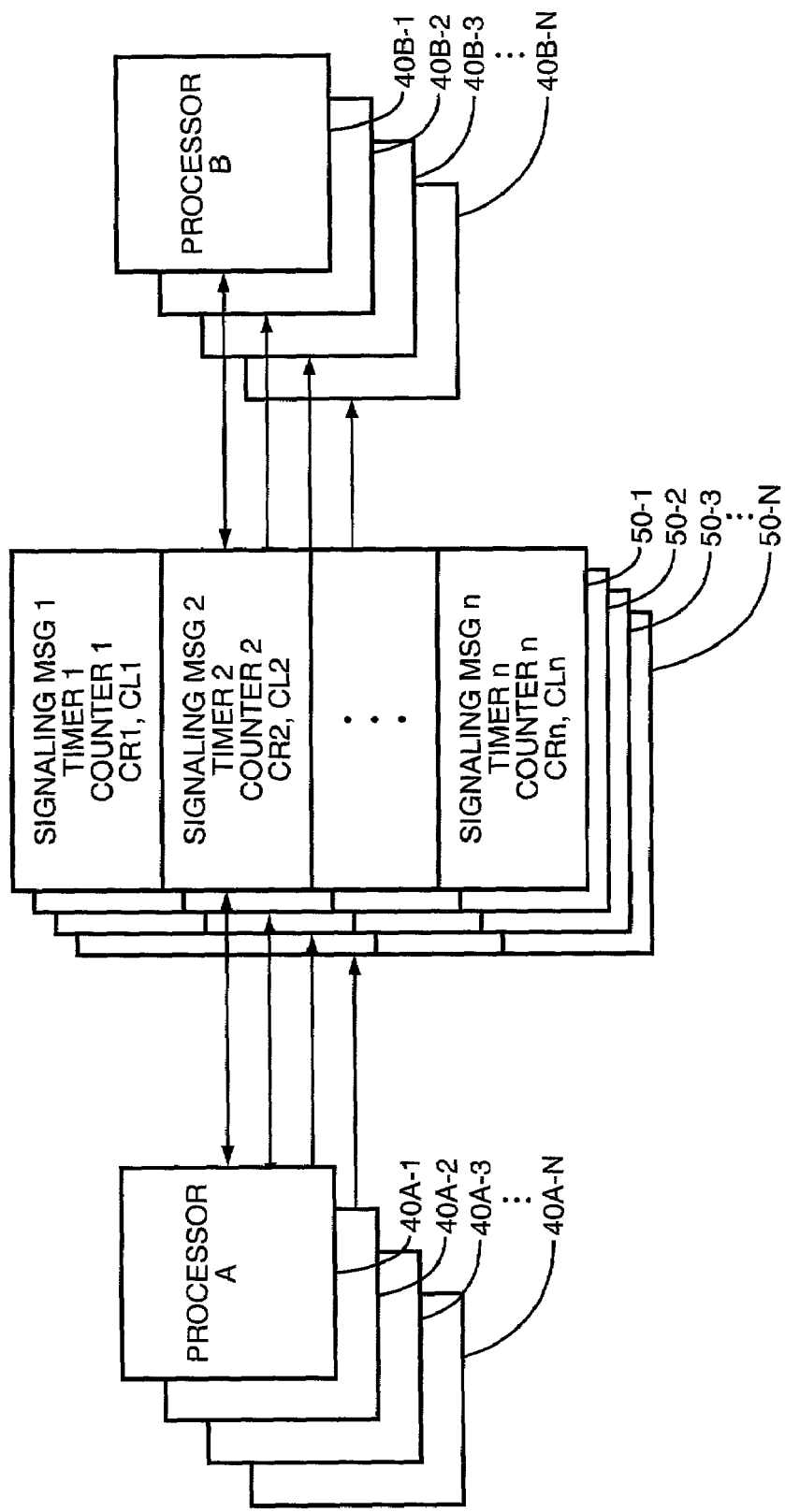
FIG. 6 is a diagram of signaling messages and corresponding vocoding and transmission timing controls.

FIG. 6 illustrates an exemplary control configuration at the BSC 22, comprising at least processors 40A-1 and 40B-1, and at least one associated data set 50-1. Some portions of data set 50-1 may be implemented in memory 46. In an exemplary approach, data sets 50 are realized in one or more buffers formed in memory 46. In this manner, processors 40A and 40B can cooperatively write to and read data from these buffers.

In one exemplary embodiment, processors 40A-1 and 40B-1 cooperate to generate and process data within data set 50-1 for one or more mobile stations 12. In an alternate exemplary embodiment, remote vocoder control is implemented on a per-mobile station basis. In this implementation, processors 40A-1 and 40B-1 use data set 50-1 to provide remote vocoder control for a first mobile station 12, while processors 40A/B-2. N and corresponding data sets 50-2. N are used to provide remote vocoder control for additional mobile stations 12.

Regardless of the particular implementation, the BSC preferably maintains separate timers 42 and counters 44 for each signaling message associated with each mobile station 12. In this manner, the BSC 22 ensures that each signaling message is sent according to its priority relative to other signaling messages, or according to some other desired priority scheme, such signaling message age.

Figure 4A:
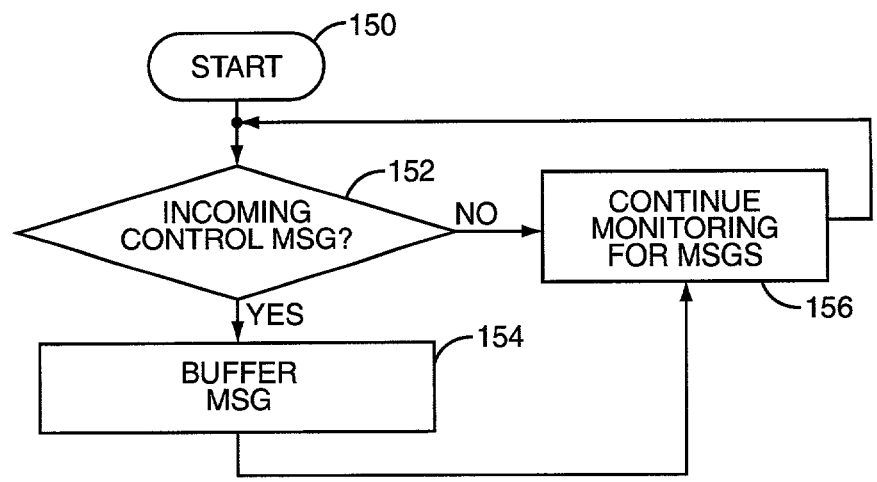
FIGS. 4A and 4B are diagrams of exemplary flow logic for remote vocoder control from the perspective of the media gateway in FIG. 1.
Figure 4B:
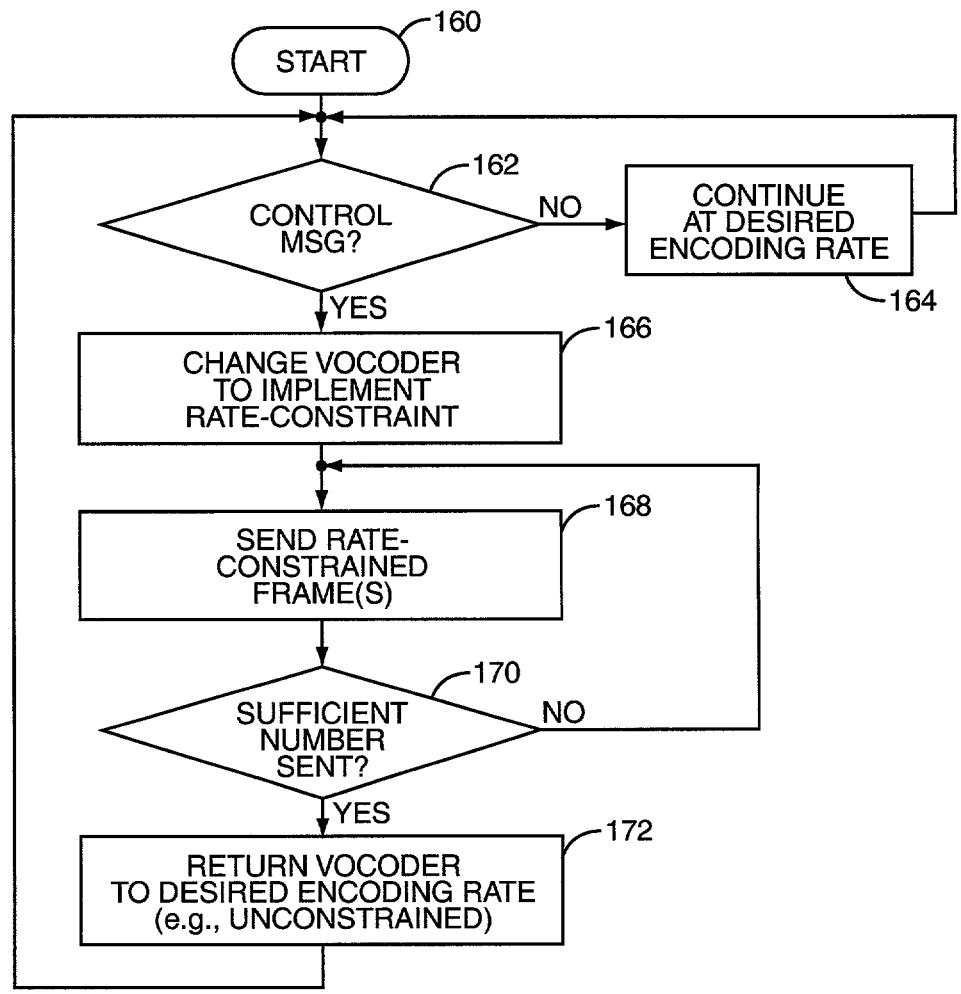

FIGS. 4A and 4B illustrate complementary logic flows at the media gateway 26 that support remote vocoder control. As with the RAN 16, the media gateway 26 might use this or similar logic to support remote vocoder control for a plurality of mobile stations 12 supported by the RAN 16.

In FIG. 4A, processing begins (step 150), with the media gateway 26 determining whether or not there are any incoming control messages from the RAN 16 (step 152). If one or more control messages are received, the media gateway 26 buffers the received messages (step 154). If no messages are received or in conjunction with buffering any received messages, the media gateway 26 continues monitoring for incoming control messages (step 156).

Figure 7:
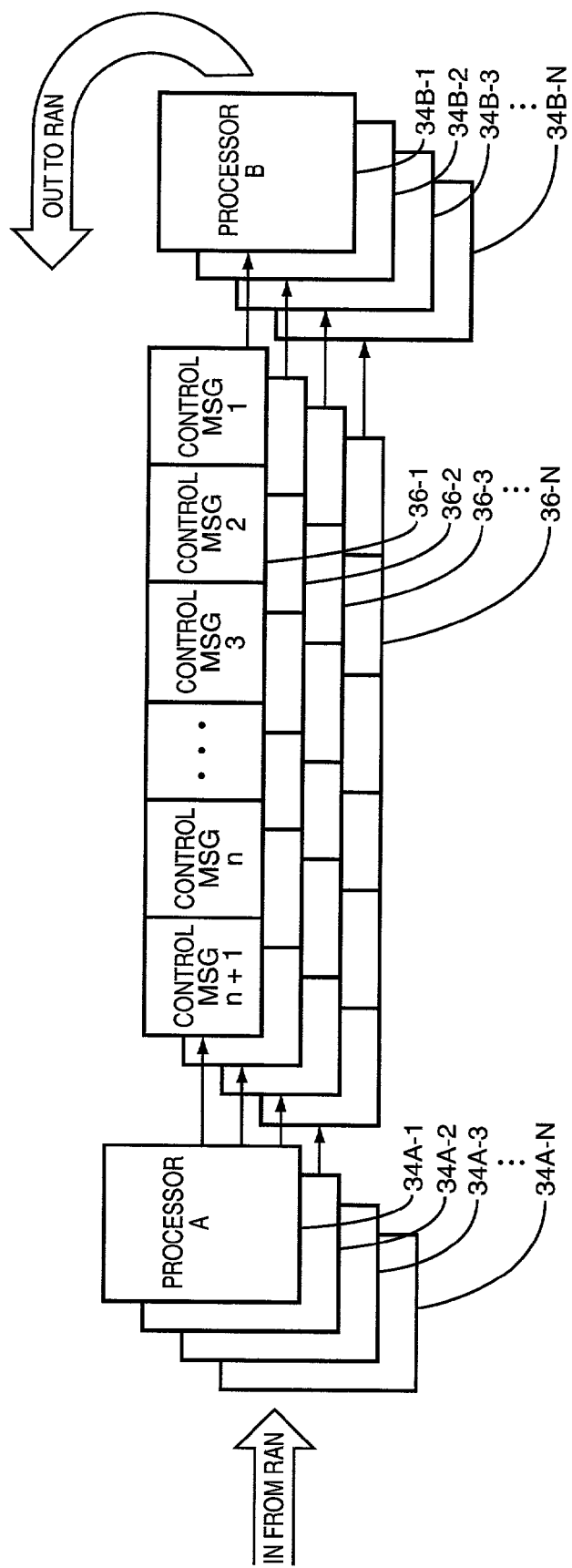
FIG. 7 is a diagram of control message buffering and corresponding vocoding controls as might be used in the media gateway of FIG. 1.

The media gateway 26 may receive a plurality of control messages in association with one or more mobile stations 12. Control messages may be buffered and serviced in the order received. FIG. 7 illustrates an exemplary approach, where processor 34A-1 and processor 34B-1 provide control message processing and vocoder control functions. In some embodiments, processors 34A-1 and 34B-1 provide vocoding control for voice frames associated with a plurality of mobile stations 12. Thus, processor 34A-1 queues control messages from different mobile stations 12 in the buffer 36-1, which comprises some or all of memory 36 in the media gateway 26. Processor 34B-1 then retrieves messages from the buffer 36-1, and rate-constrains voice frames for the corresponding mobile stations 12 in accordance with the control messages.

In other embodiments, processors and buffers are logically grouped, such that each group serves a given mobile station 12. In this embodiment, processors 34A/B-1 and buffer 36-1 support vocoding control operations responsive to control messages received in association with control signaling at the BSC 22 for a first mobile station 12. Similarly, processors 34A/B-2 . . . N and associated buffers 36-2 . . . N provide vocoding support for an additional number of mobile stations 12. Thus, the illustrated logic may execute in parallel for a plurality of mobile stations 12.

Of course, this arrangement may represent logical instantiations of processing and buffering functions rather than physically separate processing functions. That is, the set of processors 34A/B-1 . . . N and corresponding buffers 36-1 . . . N may be a logical arrangement rather than a physical arrangement within the media gateway 26. Further, note that buffers 36-1 . . . N might adopt first-in-first-out (FIFO) buffering, or might adopt some other queuing scheme.

FIG. 4B illustrates operations after receiving a control message, or when a control message is otherwise buffered and available for processing. These operations may repeat until all buffered control messages are processed, and may, as noted, execute in parallel for a plurality of mobile stations. Processing begins (step 160) by determining whether a control message is available for processing (step 162). In an exemplary embodiment, for a given mobile station 12, processor 34A-1 receives and buffers control messages in accordance with the logic of FIG. 4A discussed above, while processor 34A-1B retrieves and processes buffered control messages to provide rate-constrained voice frames.

If no control message is available for processing (step 162), the media gateway 26 continues encoding at the desired rate, which generally implies full-rate encoding (step 164). If a control message is available for processing (step 162), the media gateway 26 changes the encoding rate of the vocoder 32 with respect to the voice frames corresponding to the mobile station 12 with which the control message is associated (step 166). In other words, the media gateway 26 begins rate constraining voice frames intended for the mobile station 12 in accordance with the control message. However, as noted earlier, the media gateway 26 may use a greater rate constraint than was requested by the RAN 16.

The media gateway 26 then transfers one or more rate-constrained voice frames to the RAN 16 (step 168). It will continue sending rate-constrained voice frames until the requested number (i.e., the frame count) of rate-constrained frames is sent, or an equivalent number of more greatly constrained voice frames. For example, if the RAN 16 requested four frames at a ½ encoding rate, the media gateway 26 might send four ½ rate frames, or might send a fewer number of ¼ rate frames instead. In either case, the RAN 16 is provided with enough rate-constrained frames to support its desired dim-and-burst signaling.

In any case, the media gateway 26 tracks the number of rate-constrained frames it sends and determines whether a sufficient number have been sent (step 170). Once a sufficient number of rate-constrained voice frames is sent, the media gateway 26 switches or returns the vocoder 32 to the earlier desired encoding rate (e.g., full rate), or some other desired encoding rate (step 172), and processing returns to monitoring or checking for control messages (step 162). In either case, the media gateway 26 preferably does not use the rate-constrained encoding value any longer than is necessary to support the RAN's dim-and-burst signaling.

While the operating logic described above represents an exemplary approach to robustly controlling remote vocoding functions within the network 10, it should be understood that the present invention permits significant variation. For example, the control message format may be varied, as can the timer/counter techniques for insuring that the RAN 16 timely sends signaling messages to mobile stations 12, whether by dim-and-burst or by blank-and-burst-signaling. Thus, the present invention is not limited by the foregoing description rather it is limited only by the scope of the following claims, and the reasonable equivalents thereof.

What is claimed is:

1. A method of remote vocoder control within a wireless communication network, the method comprising:
   determining rate-constraint and corresponding frame count values sufficient to send desired signaling information from a radio access network (RAN) to a mobile station in a number of rate-constrained voice frames using dim-and-burst signaling; and
   generating a control message comprising the rate-constraint and frame count values for a remote media gateway providing voice frames to the RAN for transmission to the mobile station, the media gateway performing vocoding functions responsive to control messages received from the RAN.

2. The method of claim 1 further comprising:
   sending the control message to the media gateway;
   receiving one or more rate-constrained voice frames from the media gateway at the RAN responsive to sending the control message; and
   transmitting the signaling information to the mobile station by inserting the signaling information into the rate-constrained voice frames using dim-and-burst signaling.

3. The method of claim 2 further comprising transmitting any remaining portion of the signaling information to the mobile station using blank-and-burst signaling if a sufficient number of rate-constrained voice frames are not received within a defined time period of sending the control message to the media gateway.

4. The method of claim 3 further comprising:
   starting a timer in association with sending the control message; and
   determining the end of the defined time period as an expiration of the timer.

5. The method of claim 4 further comprising configuring an expiration period of the timer based on the signaling information to be sent to the mobile station.

6. The method of claim 4 further comprising:
   incrementing a counter each time at least a portion of the signaling information is sent via one of the rate-constrained voice frames received at the RAN from the media gateway responsive to the control message; and
   stopping the timer if the counter reaches the frame count value sent in the control message.

7. The method of claim 4 further comprising:
   tracking transmission of the signaling information; and
   stopping the timer if all of the signaling information is sent before expiration of the timer.

8. The method of claim 1 further comprising configuring the control message as binary fields within a voice frame passing from the RAN to the media gateway.

9. The method of claim 8 further comprising:
   defining a first one of the binary fields as the rate-constraint value specifying a binary-encoded rate constraint; and
   defining a second one of the binary fields as the frame count value specifying a binary-encoded frame count;
   wherein the rate constraint indicates a constraint relative to a full-rate setting in use by the media gateway for the mobile station, and wherein the frame count specifies the number of rate-constrained voice frames required to send all of the signaling information.

10. The method of claim 9 further comprising defining a third one of the binary fields as an indicator field that alerts the media gateway to the presence of the first and second fields.

11. The method of claim 1 further comprising controlling vocoding functions at the media gateway for a plurality of mobile stations supported by the RAN.

12. The method of claim 1 further comprising controlling vocoding functions at the media gateway from a base station controller (BSC) comprising a portion of the RAN.

13. A method of performing vocoding at a media gateway operating within a wireless communication network, the method comprising:
   receiving voice data for a mobile station from a Public Switched Telephone Network (PSTN);
   encoding the voice data into voice frames at a desired encoding rate for transfer to a radio access network (RAN) supporting the mobile station;
   receiving a control message from the RAN comprising a rate constraint value and a frame count value;
   constraining the encoding rate for a number of subsequent voice frames sent from the media gateway to the RAN for the mobile station responsive to the control message, wherein the number of rate-constrained voice frames sent is limited by the frame count in the control message; and
   returning to the desired encoding rate after sending the rate-constrained voice frames.

14. The method of claim 13 further comprising:
   receiving a plurality of control messages;
   buffering the control messages; and responding to buffered control message based on a defined priority.

15. The method of claim 14 further comprising setting the defined priority as a first-in-first-out priority such that buffered control messages are processed in the order received.

16. The method of claim 13 further comprising controlling the encoding rate for a plurality of mobile stations responsive to corresponding control messages sent by the RAN.

17. The method of claim 13 further comprising receiving the control message from a base station controller (BSC) supporting radio communication with the mobile station.

18. The method of claim 13 further comprising receiving voice frames from the RAN through a packet core network, and wherein voice frames are carried as packet data through the packet core network.

19. The method of claim 18 further comprising receiving the control message within a voice frame received from the RAN.

20. The method of claim 13 further comprising receiving the voice data from the PSTN as 64 kbit pulse-code-modulated (PCM) data.

21. The method of claim 13 wherein the desired encoding rate is considered full-rate encoding for a call the mobile station is engaged in, and wherein constraining the encoding rate of voice frames responsive to the control message comprises reducing the encoding rate to at least the rate constraint value specified by the control message.

22. The method of claim 21 further comprising rate constraining fewer frames than specified by the frame count value in the control message if encoding is constrained to a lower encoding rate than that specified by the rate constraint value in the control message.

23. The method of claim 22 wherein a lower encoding rate corresponds to a lower bit rate for the encoded voice data.

24. A method of controlling vocoding within a wireless communication network, the method comprising:
  receiving voice data for a mobile station at a media gateway;
  encoding the voice data into voice frames at a desired encoding rate;
  transferring the voice frames to a radio access network (RAN) supporting radio communication with the mobile station;
  determining rate constraint and frame count values required to transmit desired signaling information using dim-and-burst signaling within voice frames transmitted to the mobile station by the RAN;
  sending a control message comprising the rate constraint and frame count values from the RAN to the media gateway;
  constraining the encoding rate for a defined number of subsequent voice frames sent from the media gateway to the RAN for the mobile station responsive to the control message;
  sending the desired signaling information to the mobile station from the RAN using dim-and-burst signaling within the rate-constrained voice frames received from the media gateway responsive to the control message; and
  returning to a desired encoding rate at the media gateway after sending the defined number of rate-constrained frames.

25. The method of claim 24 further comprising sending any remaining portion of the desired signaling information from the RAN to the mobile station using blank-and-burst signaling if a sufficient number of rate-constrained voice frames are not received from the media gateway at the RAN within a defined time period of sending the control message.

26. The method of claim 25 further comprising determining the defined time period based on a timer having a defined expiration period.

27. The method of claim 26 further comprising configuring the defined expiration period of the timer based on timing requirements associated with the desired signaling information, such that the desired signaling information is sent within time limits imposed by the air interface adopted by the network for radio communications between mobile stations and the RAN.

28. The method of claim 26 further comprising:
  incrementing a counter for each rate-constrained frame received at the RAN within the expiration period of the timer; and
  stopping the timer if the counter reaches the frame count value before expiration of the timer.

29. The method of claim 26 further comprising:
  tracking transmission of the desired signaling information to the mobile station from the RAN; and
  stopping the timer if all of the desired signaling information is sent before expiration of the timer.

30. The method of claim 24 further comprising configuring the control message as binary fields within a voice frame passing from the RAN to the media gateway.

31. The method of claim 30 further comprising:
  defining a first one of the binary fields as the rate-constraint value specifying a binary-encoded rate constraint; and
  defining a second one of the binary fields as the frame count value specifying a binary-encoded frame count;
  wherein the rate constraint indicates a constraint relative to a full-rate setting in use by the media gateway for the mobile station, and wherein the frame count specifies the number of rate-constrained voice frames required to send all of the signaling information.

32. The method of claim 31 further comprising defining a third one of the binary fields as an indicator field that alerts the media gateway to the presence of the first and second fields.

33. The method of claim 24 further comprising controlling vocoding functions at the media gateway for a plurality of mobile stations supported by the RAN.

34. The method of claim 24 further comprising controlling vocoding functions at the media gateway from a base station controller (BSC) comprising a portion of the RAN.

35. A base station controller (BSC) for use in a wireless communication network, the BSC comprising at least one processor operative to:
  determine rate-constraint and corresponding frame count values sufficient to support sending desired signaling information from a radio access network (RAN) to a mobile station in a number of rate-constrained voice frames using dim-and-burst signaling; and
  generate a control message comprising the rate-constraint and frame count values for a remote media gateway providing voice frames to the RAN for transmission to the mobile station, the media gateway performing vocoding functions responsive to control messages received from the RAN.

36. The BSC of claim 35 further wherein the at least one processor:
  sends the control message to the media gateway; receives one or more rate-constrained voice frames from the media gateway at the RAN responsive to the control message; and transmits the signaling information to the mobile station by inserting the signaling information into the rate-constrained voice frames using dim-and-burst signaling.

37. The BSC of claim 36 wherein the at least one processor transmits any remaining portion of the signaling information to the mobile station using blank-and-burst signaling if a sufficient number of rate-constrained voice frames are not received within a defined time period of sending the control message to the media gateway.

38. The BSC of claim 37 wherein the at least one processor:
   starts a timer in association with sending the control message; and
   determines the end of the defined time period as an expiration of the timer.

39. The BSC of claim 38 wherein the at least one processor configures an expiration period of the timer based on the signaling information to be sent to the mobile station.

40. The BSC of claim 38 wherein the at least one processor:
   increments a counter each time at least a portion of the signaling information is sent via one of the rate-constrained voice frames received at the RAN from the media gateway responsive to the control message; and
   stops the timer if the counter reaches the frame count value sent in the control message.

41. The BSC of claim 38 wherein the at least one processor:
   tracks transmission of the signaling information; and
   stops the timer if all of the signaling information is sent before expiration of the timer.

42. The BSC of claim 35 wherein the at least one processor configures the control message as binary fields within a voice frame passing from the RAN to the media gateway.

43. The BSC of claim 42 wherein the at least one processor:
   defines a first one of the binary fields as the rate-constraint value specifying a binary-encoded rate constraint; and
   defines a second one of the binary fields as the frame count value specifying a binary-encoded frame count; and
   wherein the rate constraint indicates a constraint relative to a full-rate setting in use by the media gateway for the mobile station, and wherein the frame count specifies the number of rate-constrained voice frames required to send all of the signaling information.

44. The BSC of claim 43 wherein the at least one processor defines a third one of the binary fields as an indicator field that alerts the media gateway to the presence of the first and second fields.

45. The BSC of claim 35 wherein the at least one processor controls vocoding functions at the media gateway for a plurality of mobile stations supported by the RAN.

46. The BSC of claim 35 wherein the at least one processor comprises a plurality of processing systems within the BSC.

47. A media gateway for use in a wireless communication network, the media gateway comprising at least one processor operative to:
   receive voice data for a mobile station from the Public Switched Telephone Network (PSTN);
   encode the voice data into voice frames at a desired encoding rate for transfer to a radio access network (RAN) supporting the mobile station;
   receive a voice frame associated with the mobile station from the RAN containing a control message comprising both a rate constraint value and a frame count value;
   constrain the encoding rate for a number of subsequent voice frames sent from the media gateway to the RAN for the mobile station responsive to the control message, wherein the number of rate-constrained voice frames sent is limited by the frame count in the control message; and
   return to the desired encoding rate after sending the rate-constrained voice frames.

48. The media gateway of claim 47 wherein the at least one processor:
   receives a plurality of control messages;
   buffers the control messages; and
   responds to each control message in the order the control messages were received at the media gateway.

49. The media gateway of claim 47 wherein the at least one processor controls the encoding rate for a plurality of mobile stations responsive to corresponding control messages sent by the RAN.

50. The media gateway of claim 47 wherein the at least one processor receives the control message from a base station controller (BSC) supporting radio communication with the mobile station.

51. The media gateway of claim 47 wherein the at least one processor receives voice frames from the RAN through a packet core network, and wherein voice frames are carried as packet data through the packet core network.

52. The media gateway of claim 47 wherein the at least one processor receives the voice data from the PSTN as 64 kbit pulse-code-modulated (PCM) data.

53. The media gateway of claim 47 wherein the desired encoding rate is considered full-rate encoding for a call the mobile station is engaged in, and wherein the at least one processor constrains the encoding rate of voice frames responsive to the control message by reducing the encoding rate to at least the rate constraint value specified by the control message.

54. The media gateway of claim 53 wherein the at least one processor rate-constrains fewer frames than specified by the frame count value in the control message if encoding is constrained to a lower encoding rate than that specified by the rate constraint value in the control message.

55. The media gateway of claim 54 wherein a lower encoding rate corresponds to a lower bit rate for the encoded voice data.

56. The media gateway of claim 47 wherein the at least one processor comprises a plurality of processing systems within the media gateway.

57. The media gateway of claim 47 further comprising memory operative to buffer control messages received from the RAN at the media gateway.

58. A wireless communication network comprising:
   a base station controller (BSC) comprising at least one processor adapted to control remote vocoding operations such that voice frames sent to the BSC for transmission to a mobile station may be temporarily rate-constrained in support of the BSC sending signaling messages to the mobile station using dim-and-burst signaling; and
   a media gateway comprising at least one processor adapted to rate-constrain voice frames sent from the media gateway to the BSC for the mobile station responsive to control messages from the BSC, and wherein the BSC generates control messages such that each control message defines a desired rate-constraint value and a corresponding frame count value specifying the number of frames to which the rate-constraint value should be applied.

59. The network of claim 58 wherein the media gateway, for a given control message, limits the number of voice frames to which the rate-constraint is applied based on the frame count value in the control message.

60. The network of claim 59 wherein the media gateway returns to a desired encoding rate after rate-constraining a defined number of voice frames responsive to a control message.

61. The network of claim 58 wherein the BSC and the media gateway cooperate to provide vocoding control for a plurality of mobile stations.

62. The network of claim 61 wherein the BSC generates control messages specific to each of the plurality of mobile stations, and wherein the media gateway applies rate-constraints associated with a given control message to the voice frames associated with the corresponding mobile station.

63. The network of claim 58 wherein the BSC sends signaling information to the mobile station using blank-and-burst signaling techniques for any remaining portion of a given signaling message if a sufficient number of rate-constrained voice frames for the mobile station are not received within a defined time period after sending the control message.

* * * * *

UNITED STATES PATENT AND TRADEMARK OFFICE
CERTIFICATE OF CORRECTION

| | | |
|---|---|---|
| PATENT NO. | : 7,103,033 B2 | |
| APPLICATION NO. | : 10/033091 | |
| DATED | : September 5, 2006 | |
| INVENTOR(S) | : Gao | |

It is certified that error appears in the above-identified patent and that said Letters Patent is hereby corrected as shown below:

Column 13, lines 63-64, should be changed from "receive voice data for a mobile station from the Public Switched Telephone Network (PSTN);" to --receive voice data for a mobile station from a Public Switched Telephone Network (PSTN);--

Signed and Sealed this

Sixth Day of February, 2007

JON W. DUDAS
*Director of the United States Patent and Trademark Office*